United States Patent
Bigler et al.

(10) Patent No.: US 7,116,980 B2
(45) Date of Patent: Oct. 3, 2006

(54) METHOD AND SYSTEM FOR MANAGEMENT OF RADIO FREQUENCY COMMUNICATION COVERAGE OVER WIDE GEOGRAPHIC AREAS

(75) Inventors: Glenn Patrick Bigler, Pittsburgh, PA (US); John Patrick Kelly, Nevillewood, PA (US); David Paul O'Toole, McKees Rocks, PA (US); Michael John Weir, McMurray, PA (US); Michael Glen Ramke, Houston, TX (US); Jed Peter Fawaz, Nevillewood, PA (US); David Colin Parsons, Upper St. Clair, PA (US)

(73) Assignee: Crown Castle International Corp., Houston, TX (US)

( * ) Notice: Subject to any disclaimer, the term of this patent is extended or adjusted under 35 U.S.C. 154(b) by 241 days.

(21) Appl. No.: 10/739,516

(22) Filed: Dec. 18, 2003

(65) Prior Publication Data
US 2005/0136931 A1   Jun. 23, 2005

(51) Int. Cl.
H04Q 7/20   (2006.01)
(52) U.S. Cl. ..................... 455/446; 370/254
(58) Field of Classification Search ............... 455/446; 370/254
See application file for complete search history.

(56) References Cited

U.S. PATENT DOCUMENTS

| | | | | |
|---|---|---|---|---|
| 5,095,500 A | * | 3/1992 | Tayloe et al. ............ | 379/32.01 |
| 5,561,841 A | * | 10/1996 | Markus ...................... | 455/446 |
| 5,655,217 A | * | 8/1997 | Lemson ...................... | 455/513 |
| 5,893,904 A | * | 4/1999 | Harris et al. ................. | 705/27 |
| 6,104,712 A | * | 8/2000 | Robert et al. ............... | 370/389 |
| 6,111,857 A | * | 8/2000 | Soliman et al. ............ | 370/254 |
| 2002/0025822 A1 | * | 2/2002 | Hunzinger .................. | 455/456 |

* cited by examiner

Primary Examiner—George Eng
Assistant Examiner—Ariel Balaoing
(74) Attorney, Agent, or Firm—Andrew J. Dillon; Dillon & Yudell LLP

(57) ABSTRACT

A method and system for management of radio frequency coverage over a wide geographic area. A database is created specifying a geographic location for each of a large number of existing communication locations within a wide geographic area. Selected physical parameters are then associated with each communication location including: addresses; site plans; structural drawings; and, actual measured signal strength for multiple entities authorized to transmit at selected frequencies within that geographic area. Thereafter, communication locations may be automatically accessed by specifying either a physical location or by accessing those locations where measured signal strengths fall below a selected level. Once accessed, all stored physical parameters associated with a selected communication location may be displayed, including: photographs of the location, site plans, structural drawings and readiness data.

9 Claims, 15 Drawing Sheets

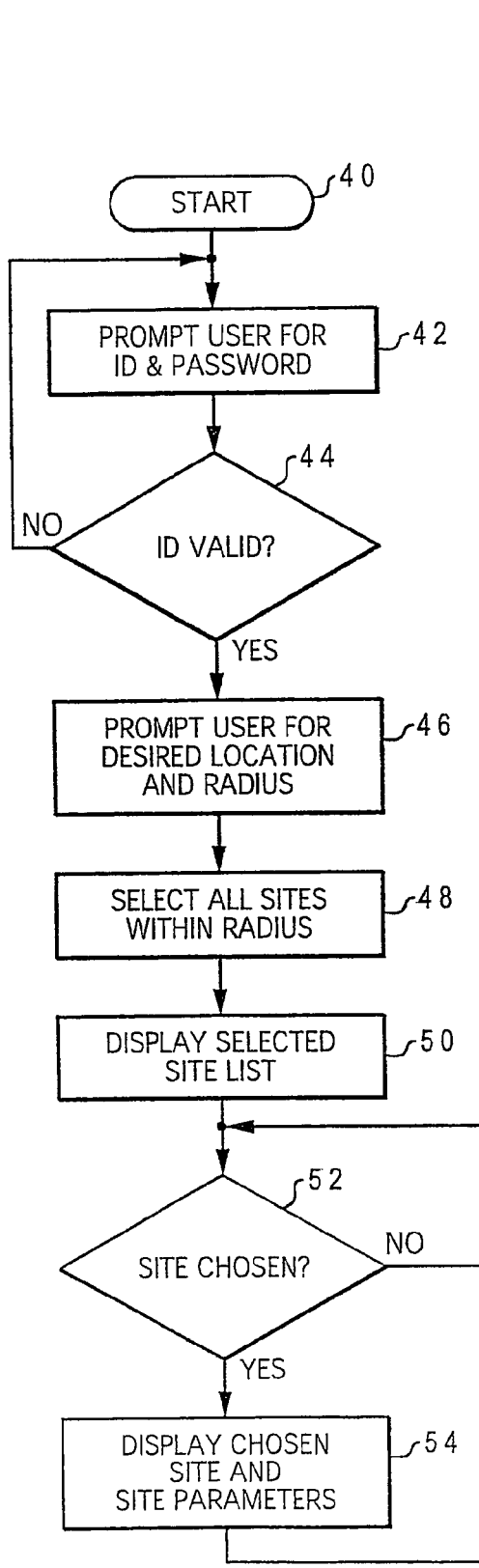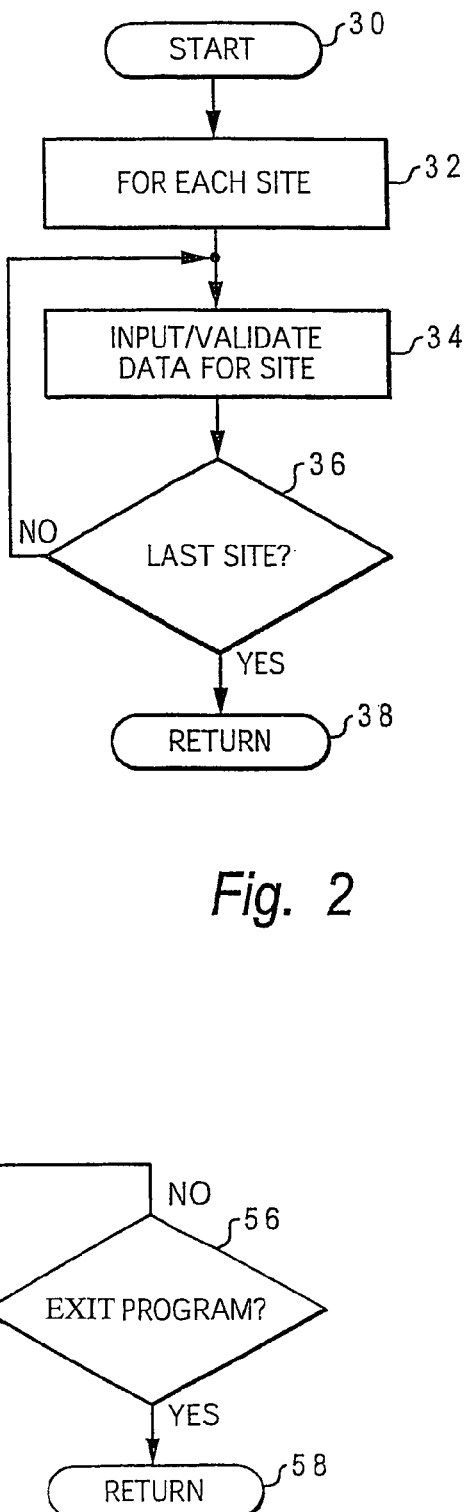
Fig. 2
Fig. 3

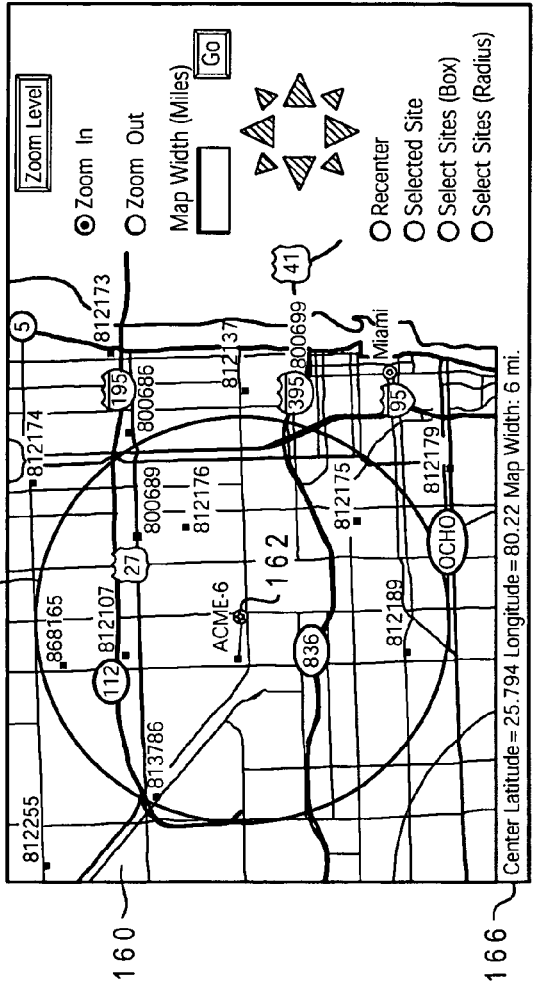

| Band | Blk | Carrier | RF Need | Rec'd Sgnl | CCI Observed Average | Tech | Failed Call Ratio | Data Points | Confi-dence | Source | Drive Date |
|---|---|---|---|---|---|---|---|---|---|---|---|
| 800 | A | CARRIER 1 | Low | -70.3 | -63.1 | TECH 1 | 0/7 | 447 | Full | Drive Team 1 | 01 Feb 2003 |
| 800 | B | CARRIER 2 | Low | -51.4 | -61.3 | TECH 2 | 0/7 | 344 | Full | Drive Team 1 | 01 Feb 2003 |
| 800 | ES | CARRIER 3 | Medium | -80.4 | -69.3 | TECH 3 | 2/9 | 497 | Full | Drive Team 1 | 01 Feb 2003 |
| 1900 | A | CARRIER 4 | Low | -76.8 | -71.1 | TECH 4 | 4/9 | 583 | Full | Drive Team 1 | 01 Feb 2003 |
| 1900 | B | CARRIER 5 | Low | -65.7 | -68.9 | TECH 5 | 0/7 | 475 | Full | Drive Team 1 | 01 Feb 2003 |
| 1900 | D | CARRIER 6 | Low | -73.7 | -69.8 | TECH 6 | 0/7 | 349 | Full | Drive Team 1 | 01 Feb 2003 |
| 1900 | F | CARRIER 7 | Low | -72.1 | -73.4 | TECH 7 | 1/8 | 603 | Full | Drive Team 1 | 01 Feb 2003 |

| site map | adv. search | site list | site data |

Site ID: 815740 > Site Name: RED BLUFF > Readiness-Structure A          Site ID: [  ] Go — 174

Site Readiness Confirmation — 114
* Confirmed Date: 19 Mar 2003
* Confirmed By: CCIC_JDOE

*Indicates a Sales Priority field.

Site Links
| Main | Apply Now | View Applications | Licenses |
| Demand Profile | Directions | View Inspections | Leases |
| Map | Open Levels | Photos | Customers |
| Site Plan | Readiness | Regulatory | Documents |
| Structure A | Cad W.O. | Operations | Open Data Ticket |
| | | Engineering | | help

General Site Information

| *Site ID: | 815740 | | | |
|---|---|---|---|---|
| *Site Name: | RED BLUFF | | | |
| *Address: | 131 Pitts | | | |
| *City: Pasadena | *State: TX | *County: Harris | | |
| *Latitude: 29° 42' 52.82" | *Longitude: -95° 12' 39.76" | *Datum Ref: NAD83 | | |
| *MTA: Houston | | *BTA: Houston, TX | | |
| *Area: West | | *District: Southeast Texas | | |
| *Structure Type: | SELF SUPPORT | | | |
| *Ground Elev.: (AMSL) | 21.0 FT | | | |
| *Height Without Appurt.: | 130.0 FT | | | |
| *Height With Appurt. (AGL): | 130.0 FT | | | |

Site Demand — 176

Opportunities:

| | Distance | # Sites |
|---|---|---|
| | 0 to < 1 mile | 1 |
| | 1 to < 2 miles | 1 |
| NMS | 2 to < 3 miles | 7 |
| | 3 to < 4 miles | 18 |
| | 4 to < 5 miles | 23 |

At-A-Glance Readiness — 178
Scale 1 - 5 (1 = Excellent; 5 = Poor)

| Structural | 2 |
| Compound | 1 |
| Utilities | 3 |
| Land Use | 1 |
| Ground Lease | 1 | javascript:location.hraf = siteReadinessSingleStructureUrl

| At-A-Glance Readiness Scale 1 - 5 (1 = Excellent; 5 = Poor) ||
|---|---|
| Structural | 2 |
| Compound | 1 |
| Utilities | 3 |
| Land Use | 1 |
| Ground Lease | 1 |
| Regulatory | 1 |
| *Estimated Timeframe-Application to Completed Installation (in days) | 60.0 |

*Fig. 15*

| Structure Information ||
|---|---|
| *Open Levels: | 121 - 130 ft<br>30 - 113 ft |
| OptiShare: | No |
| Available Ports:<br>Technology Description A = 1900MHz<br>B = 800MHz C = 1900MHz | Please Select |
| Centerline Height (ft.): | |
| Current As-Built Drawing: | No |
| *% Available Structural Capacity: | 50.0 |
| Number of Applications in Progress: | 1 |

| | Image(s) Present? | Validated? |
|---|---|---|
| Manufacturer Drawing: | Yes | Yes |
| Foundation Drawing: | Yes | Yes |
| Geotech Drawing: | Yes | Yes |
| Tower Extension/ Modification Drawing: | No | No |
| Structure Analysis: | No | No |
| Structure Comments: | | |

*Fig. 16*

| Compound Information | |
|---|---|
| *Number of Standard Shelter Spaces Available: | 2.0 |
| *Number of Other Useable Spaces Available: | 1.0 |
| Can Addl Ground Space be Acquired? | No |
| Is CCIC Building Present? | No |
| Is Space Available in CCIC Building? | Please Select |
| Size of Compound (sq. ft.): | 4,613.6 |
| Size of Leased Area (sq. ft.): | 14,500.0 |
| Compound Comments: | |
| Compound may need to be expanded for next install. | |

| Utility Information | |
|---|---|
| Is 200+ Amp Power Available at Site? | Yes |
| Is Meter Space Available? | No |
| CCIC Generator On Site? | No |
| Is CCIC Generator Capacity Available? | Please Select |
| Utility Comments: | |
|  | |

| Land Use Information | |
|---|---|
| Land Use Permit Required for Antenna Installation?: | Yes |
| Landlord Signature Required on Land Use Application?: | No |
| Estimated Time to Obtain Land Use Approvals From Application Submitted (in days): | 30.0 |
| Land Use Comments: | |
| Building permit may be required | |

| Ground Lease Information | |
|---|---|
| Next Expiration of Lease: | |
| Renewal Type: | |
| Final Expiration of Lease: | |
| Revenue Share: | |
| Landlord Consent to Sublease: | No Consent Required |
| Landlord Consent Reqd for Alternations/Modifications: | No |
| Ground Lease Comments: | |
| Site is owned | |

| Regulatory Information | |
|---|---|
| Is FCC ASR Number Applicable? | Yes |
| FCC ASR Number: | 1046846 |
| FAA Study Number: | 95-ASW-1690-OE |
| NEPA Date: | Not Available |
| Phase I Date: | Not Available |
| What are the Approved Frequency Bands? | A |
| Directional AM Station Within 3.2 Km? | No |
| Non-Directional AM Station Within 1.0 Km? | No |
| If Yes to Either Answer, Has AM Analysis Been Performed? | No |
| Regulatory Comments: | |
| | |

METHOD AND SYSTEM FOR MANAGEMENT OF RADIO FREQUENCY COMMUNICATION COVERAGE OVER WIDE GEOGRAPHIC AREAS

BACKGROUND OF THE INVENTION

1. Technical Field

The present invention relates in general to the management of radio frequency coverage over wide geographic areas and in particular to a method and system for efficiently managing large numbers of communication sites disposed over a wide geographic area. Still particularly, the present invention relates to a method and system for managing a large number of communication sites while preserving efficient access to various physical parameters associated with each site.

2. Description of the Related Art

Wireless communication systems, such as cellular telephone systems, have increased dramatically in recent years. The cellular telephone industry is currently utilizing a number of communication protocols for use with wireless telephones, filling out a larger number of frequency bands within which wireless telephones may operate and expanding into the utilization of various other wireless communication devices. Typical communication protocols may now include, without limitation, AMPS, N-AMPS, TDMA, CDMA, GSM, TACS wireless and ESMR. Newer wireless protocols may also include, without limitation, EVOO, WCDMA, WiFi and DAB. The particular protocol utilized for wireless communication, with respect to the present invention, is not determinative; however, each of these protocols has in common the requirement that wireless communications occur between individual customers and various mobile switching stations which serve as an interface between those customers and the telephone system, mobile media system, or other communication system.

Substantially all communication between mobile users and the primary communication system, in or contemplated in these types of systems, utilizes two types of "channels," including control channels which may be utilized for conveying information about the individual customer, for initiating or terminating communication, or for transferring data such as a short message system transfer. Voice channels are utilized in conjunction with control channels for conveying verbal communication over a wireless interface and are typically utilized only after a communications session or a call has been initiated utilizing the control channels.

Whatever protocol is utilized the one constant in such communication systems is the necessity of providing multiple mobile switching centers each having a communications site therein which may be utilized to communicate with individual customers utilizing radio frequency transmissions.

Management of any wireless communication system therefore requires management of multiple communication sites disposed at various locations throughout the countryside where communication will take place. These communication sites typically comprise towers; however, buildings, water towers or other structures may also be utilized as convenient points for such communication sites. Thus, it should be apparent that the sheer number of such communication sites necessary to maintain a large, state-of-the-art communication system can create a substantial management burden. It should therefore be obvious that a need exists for a method and system which permits efficient management of radio frequency communication over wide geographic areas.

SUMMARY OF THE INVENTION

It is therefore one object of the present invention to provide an improved method for management of radio frequency coverage over a wide geographic area.

It is another object of the present invention to provide an improved method and system for efficiently managing large numbers of communication sites disposed over a wide geographic area.

It is yet another object of the present invention to provide an improved method and system for managing a large number of communication sites while preserving efficient access to various physical parameters associated with each site.

The foregoing objects are achieved as is now described. The method and system of the present invention may be utilized for management of radio frequency coverage over a wide geographic area. A database is created specifying a geographic location for each of a large number of possible communication locations within a wide geographic area. Selected physical parameters are then associated with each communication location including: addresses; site plans; structural drawings; and, actual measured signal strength for multiple entities authorized to transmit at selected frequencies within that geographic area. Thereafter, communication locations may be automatically accessed by specifying either a physical location or by accessing those locations where measured signal strengths fall below a selected level. Once accessed, all stored physical parameters associated with a selected communication location may be displayed, including: photographs of the location, site plans, structural drawings and readiness data.

BRIEF DESCRIPTION OF THE DRAWINGS

The novel features believed to be characteristic of the invention are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

FIG. 2 is a high level logic flow chart illustrating a process for populating a database for use with the computer network of FIG. 1;

FIG. 3 is a high level logic flow chart illustrating a process for selecting and displaying multiple communication sites in accordance with a first embodiment of the method and system of the present invention;

FIG. 11 is a tabular illustration of measured communication signal strength for various transmitting entities in the vicinity of the selected communication site of FIG. 8, displayed in accordance with the method and system of the present invention;

FIG. 12 is a pictorial representation of the selection of all communication sites within a specified radius of a designated point in accordance with the method and system of the present invention;

FIG. 14 is a pictorial representation of the general site information of a selected communication site, depicted in accordance with the method and system of the present invention;

FIG. 15 is a tabular representation of the site readiness of a selected communication site, depicted in accordance with the method and system of the present invention;

FIG. 16 is a tabular representation of the structural information for a selected communication site, depicted in accordance with the method and system of the present invention;

FIG. 17 is a tabular representation of the compound information for a selected communication site depicted in accordance with the method and system of the present invention;

FIG. 18 is a tabular representation of the utility information for a selected communication site depicted in accordance with the method and system of the present invention;

FIG. 19 is a tabular representation of the land use information for a selected communication site depicted in accordance with the method and system of the present invention;

FIG. 20 is a tabular representation of the ground lease information for a selected communication site depicted in accordance with the method and system of the present invention; and FIG. 21 is a tabular representation of the regulatory information for a selected communication site depicted in accordance with the method and system of the present invention.

DETAILED DESCRIPTION OF THE PREFERRED EMBODIMENT

Figure 1:
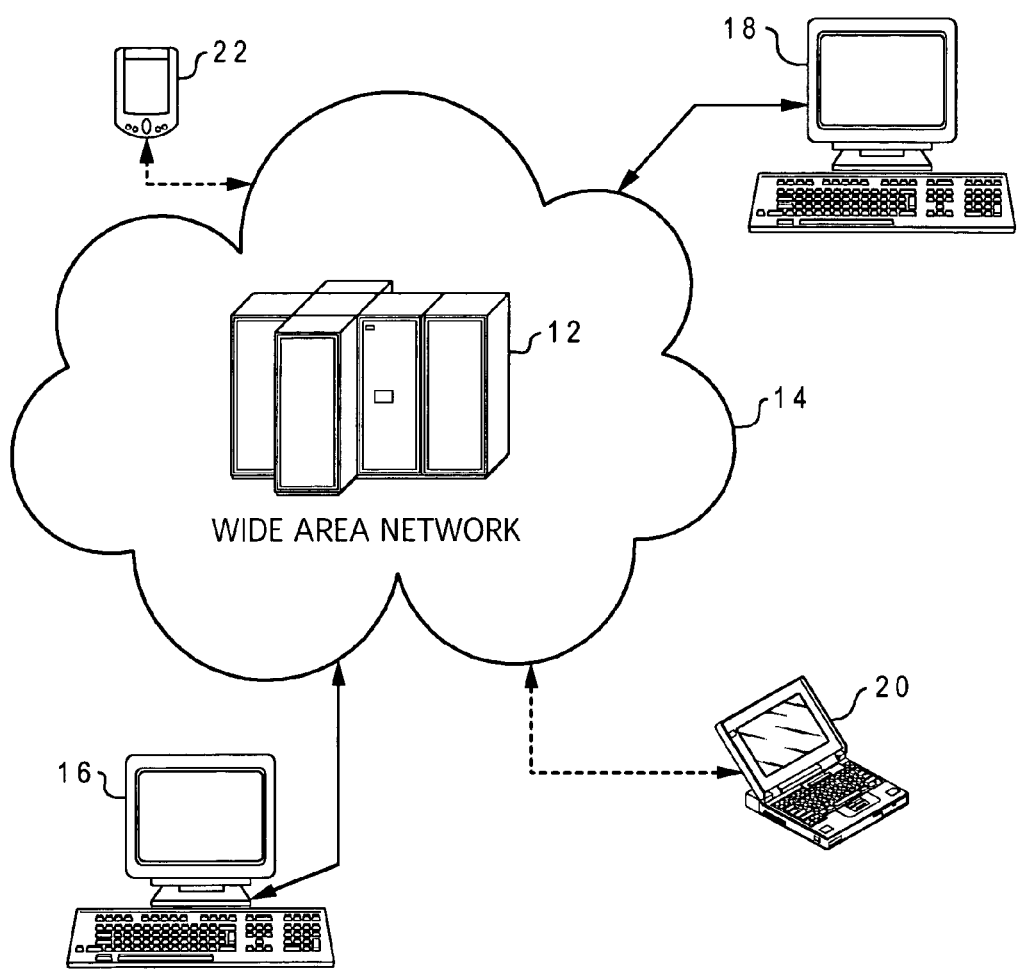
FIG. 1 is a schematic representation of a computer network for managing radio frequency communication coverage in accordance with the method and system of the present invention.

With reference now to the figures and in particular with reference to FIG. 1, there is depicted schematic representation of a computer network for managing radio frequency communication coverage in accordance with the method and system of the present invention. As illustrated, the database which forms a central feature of the present invention may be embodied within any suitable computer, such as mainframe computer 12. Those having ordinary skill in the art will appreciate that mainframe computer 12 maybe implemented utilizing any suitable computer including personal computers, midrange computers, workstations or the like. Access to mainframe computer 12 is preferably accomplished over a distributed network, such as wide area network 14. Thus, multiple users may access the data within mainframe computer 12, which is utilized to manage radio frequency communication coverage, utilizing distributed computers having access to wide area network 14.

For example, desktop personal computers 16 and 18 may connect to wide area network 14 utilizing conventional dial-up or hardwired connections to access the database within mainframe computer 12. Similarly laptop computer 20 may access the database within mainframe computer 12 utilizing a wireless connection to wide area network 14. Similarly, a handheld computing device, such as personal digital assistant device 22, may be utilized to connect to the database within mainframe computer 12 and the method and technique whereby communication occurs between these disparate computers and mainframe computer 12 is believed to be within the ambit of those having ordinary skill in this art and forms no part of the present disclosure.

Referring now to FIG. 2 there is depicted a high level logic flow chart which illustrates a process for populating a database within mainframe computer 12 of FIG. 1. As illustrated, this process begins at block 30 and thereafter passes to block 32. Block 32 indicates that for each communication site within the wide geographic area, the succeeding steps are performed. Thereafter, as depicted at block 34, data associated with each communication site is either input or validated. Those having ordinary skill in the art may appreciate that a database may be initially populated with data and thereafter the physical parameters associated with each communication site may be validated by periodic inspection of those sites in order to insure that the physical parameter data associated with a particular communication site, remains accurate and reflective of current conditions.

Thereafter, the process passes to block 36. Block 36 illustrates a determination of whether or not the data input or validated for a particular site is for the last site to be processed and if not, the process returns, in an iterative fashion to block 34 for further data input or validation. Still referring to block 36, in the event the data input or validated for the current site represents the last site to be processed, the process passes to block 38 and returns.

In this manner, a database may be created having these features which will be set forth in greater detail herein, and which may be utilized to efficiently and accurately manage radio frequency communication coverage across a wide geographic area in accordance with the method and system of the present invention.

With reference now to FIG. 3, there is depicted a high level logic flow chart which illustrates a process for selecting and displaying multiple communication sites in accordance with a first embodiment of the method and system of the present invention. As depicted, this process begins at block 40 and thereafter passes to block 42. Block 42 depicts the prompting of the user for an ID and password which will ensure that the user accessing the database is authorized to do so. Next, the process passes to block 44 which illustrates a determination of whether or not the identification and password are valid and if not, the process returns, in an iterative fashion to block 42 to await entry of an appropriate user ID and password.

Still referring to block 44, in the event the user ID and password submitted are valid, the process passes to block 46. Block 46 illustrates the prompting of that user for a desired location and a specified radius. Those having ordinary skill in the art will appreciate that a desired location for a communication site may comprise either longitude and latitude, a street address or an identification utilizing map coordinates which are unique to a particular application. Next, the process passes to block 48. Block 48 depicts the selection of all known communication sites within the selected radius of the desired location and, as illustrated at block 50, those selected sites are displayed for utilization by the user.

Next, the process passes to block 52. Block 52 illustrates a determination of whether or not the user has selected a particular site from the displayed list of communication sites and if not, the process passes to block 56 for a determination of whether or not the user has elected to exit the program. If not, the process returns, in a iterative fashion, to block 52 to await particular selection of a particular communication site by the user. Alternatively, in the event the user has elected to exit the program, the process passes to block 58 and returns.

Still referring to block 52, in the event the user has elected to choose a particular site from among the displayed list of communication sites, the process passes to block 54. Block 54 illustrates a display of the chosen site and the physical parameters associated with that site in a manner which will be illustrated in greater detail herein. Thereafter, the process once again passes to block 56 for a determination of whether or not the user desires to exit the current program and thereafter proceeds as described above.

Figure 4:
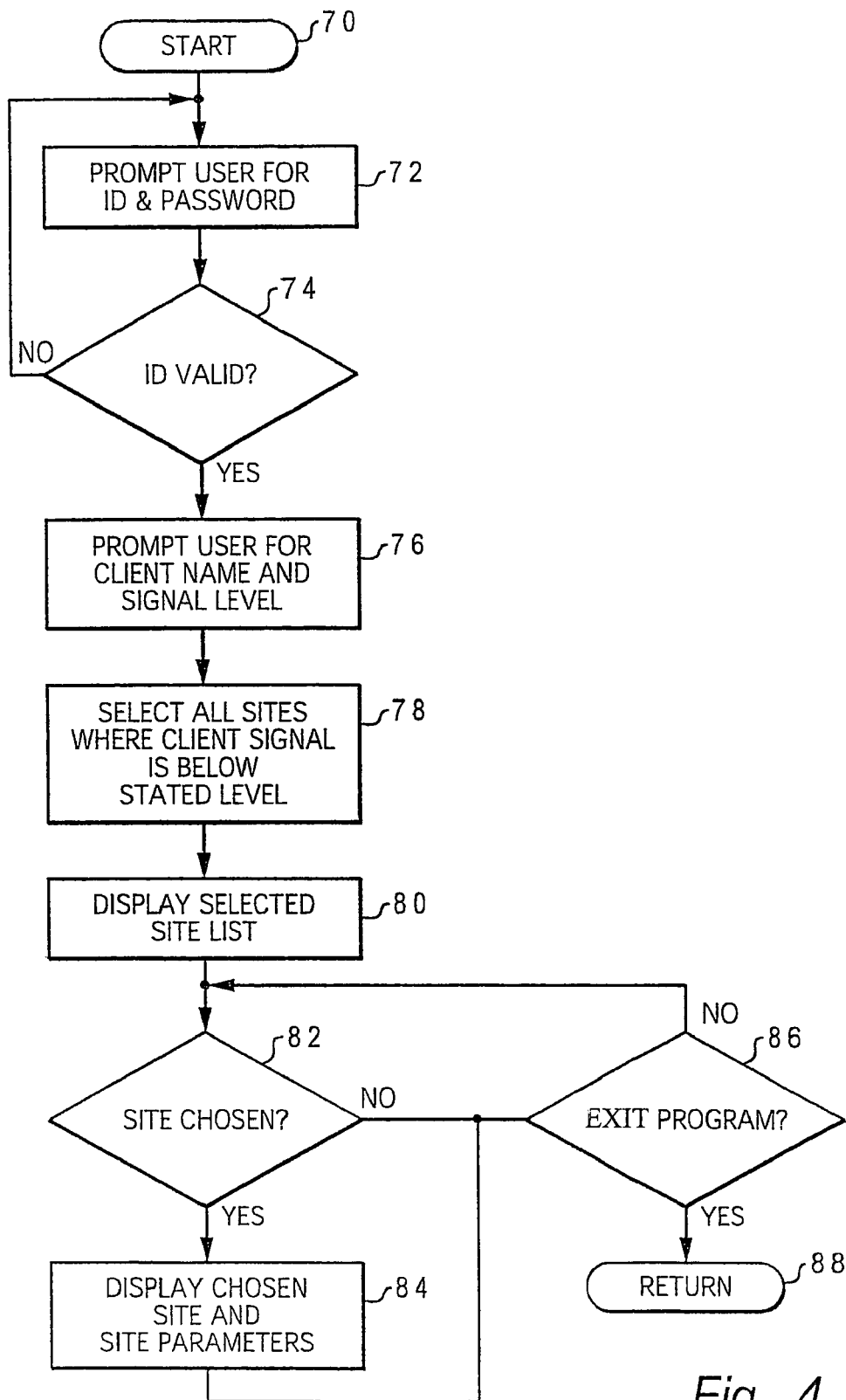
FIG. 4 is a high level logic flow chart illustrating a process for selecting and displaying multiple communication sites in accordance with a second embodiment of the method and system of the present invention.

Referring now to FIG. 4, there is depicted a high level logic flow chart which illustrates a process for selecting and displaying multiple communication sites in accordance with a second embodiment of the method and system of the present invention.

This process begins at block 70 and thereafter, in a manner similar to that described above with respect to FIG. 3, passes to block 72 were the user is prompted to enter an ID and password. Once again, as depicted in block 74, a determination is made as to whether or not the user ID and password are valid and if not, the process returns in an iterative fashion to block 72 to await entry of an appropriate user ID and password.

Still referring to block 74, in the event the user ID and password are appropriate, the process passes to block 76. Block 76 illustrates a prompting of the user to enter a particular client name and a designated signal strength level. Those having ordinary skill in the art will appreciate that communication sites are typically owned, leased or managed by independent third parties and that space and transmission facilities within those communication sites are then leased to clients desiring to augment radio frequency communication coverage within the vicinity of that site. The method and system of the present invention, as illustrated in this process, permits a user of the system to enter a particular client name and a designated signal level so that communication sites owned, leased or managed by the present system, may be searched for those locations wherein the designated client's radio frequency signal strength is below a particular level. Thus, as illustrated in block 78, the method and system of the present invention will thereafter select all communication sites within the system wherein the designated client's signal strength is below a stated level. Those having ordinary skill in this area will appreciate that signal strength may be given as an absolute value or as a ratio of signal strength to competitors' signal strengths in that particular area.

Next, the process passes to block 80. Block 80 illustrates a display of the selected site list and thereafter, in a manner similar to that described upon, the process passes to block 82 for a determination of whether or not a particular site from the displayed list has been chosen. If not, the process passes from block 82 to block 86 for a determination of whether or not the user desires to exit the present program and if not, the process returns, in an iterative fashion to block 82 to await selection of a particular communication site. In the event the user desires to exit the program, the process passes block 86 to block 88 and returns.

Still referring to block 82, in the event the user has elected to select a particular communication site from the displayed list, the process passes to block 84. Block 84 illustrates a display of the chosen site and the site parameters in a manner which will be illustrated in greater detail herein.

Figure 5:
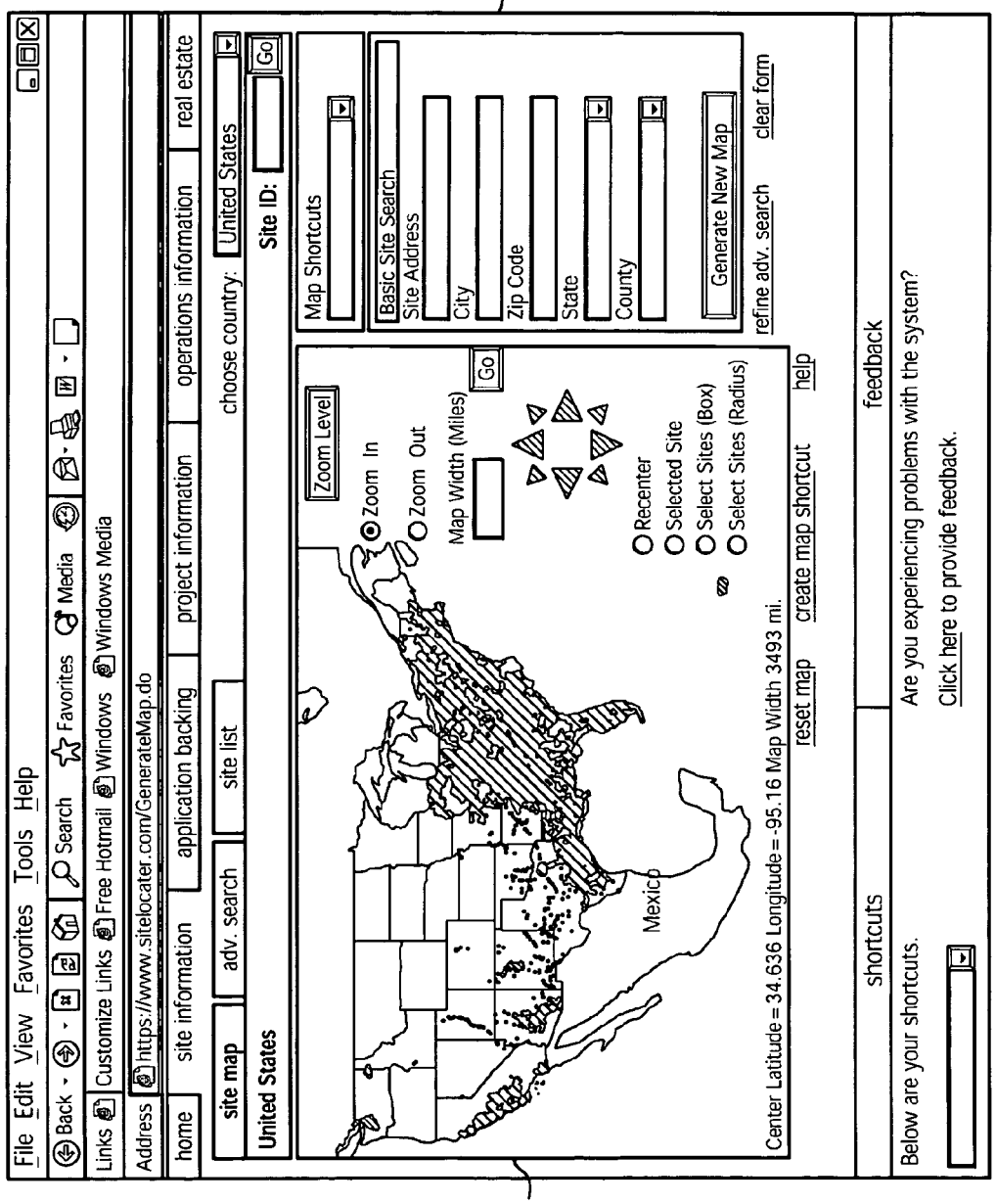
FIG. 5 is a pictorial representation of a high level map illustrating multiple communication sites in accordance with the method and system of the present invention.

Referring now to FIG. 5, there is depicted a pictorial representation of a high level map illustrating multiple communication sites in accordance with the method and system of the present invention. As depicted, the method and system of the present invention permits a user to access, initially, a map depiction which illustrates the general location for each of a plurality of communication sites. The specific example depicted within FIG. 5 is a map of the United States and within map 100 are graphic indications of communication sites that which have been identified and cataloged in accordance with the method and system of the present invention. Also depicted within FIG. 5 is a dialog box 102 which permits the user to search for a specific communication site within the system by entering the site address, city, zip code or the like.

Figure 6:
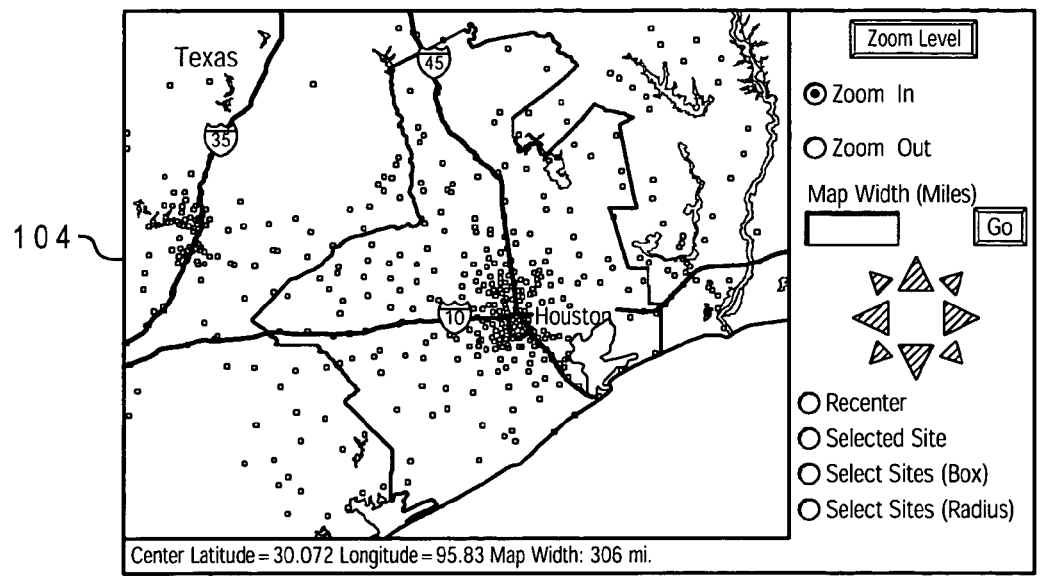
FIG. 6 is a pictorial representation of a partially zoomed-in map illustrating multiple communication sites in accordance with the method and system of the present invention.

Referring now to FIG. 6, there is depicted a pictorial representation of a partially zoomed-in map 104 illustrating multiple communication sites in accordance with the method and system of the present invention. Those having ordinary skill in the art will appreciate that map 104 may be generated automatically by graphically selecting a point within map 100, by entering a particular coordinate and radius or any other suitable graphic manipulation technique. As illustrated, having partially zoomed-in the relatively solid display of map 100, is now clearly discernable as multiple communication sites within a wide geographic area.

Figure 7:
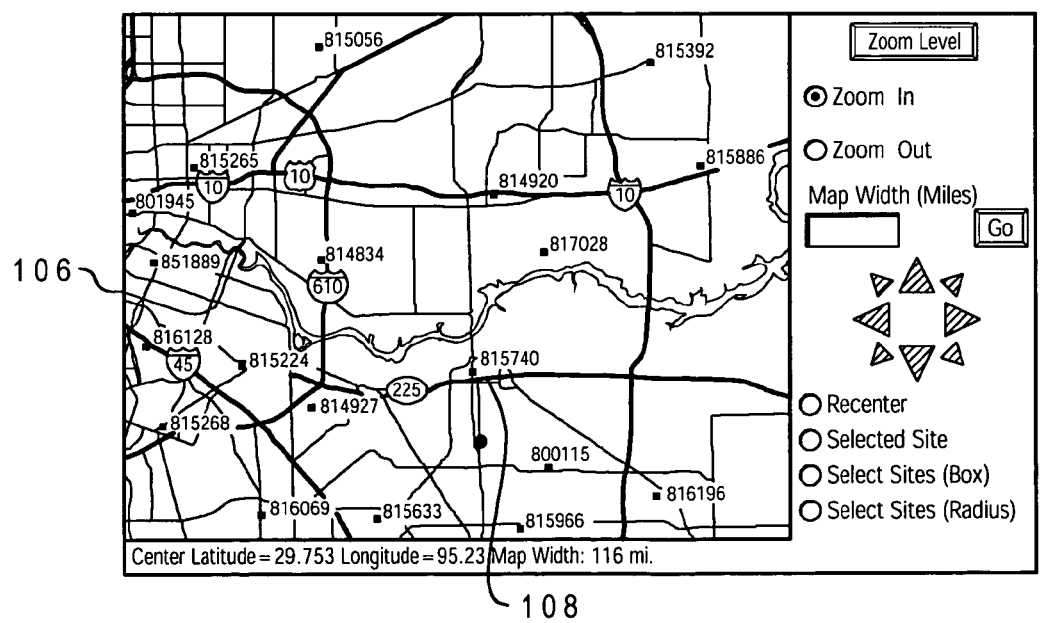
FIG. 7 is a pictorial representation of a fully zoomed-in map illustrating multiple communication sites in accordance with the method and system of the present invention.

With reference now to FIG. 7, there is a pictorial representation of a fully zoomed-in map 106 which illustrates multiple communication sites in accordance with the method and system of the present invention. As noted above, zooming in from the map depicted within FIG. 6 to the map depicted within FIG. 7 may be accomplished by the simple expedient of graphically selecting a point within the map of FIG. 6, or by entering particular map coordinates for which greater clarity is desired. As illustrated within FIG. 7, individual communication sites are now graphically indicated and each communication site has associated therewith a site identification indicia. Thus, as will be explained in greater detail herein, a particular communication site may be selected and the data associated with that site may be displayed in a highly efficient manner, permitting significant efficiency in the management of radio frequency communication over a wide geographic area.

Figure 8:
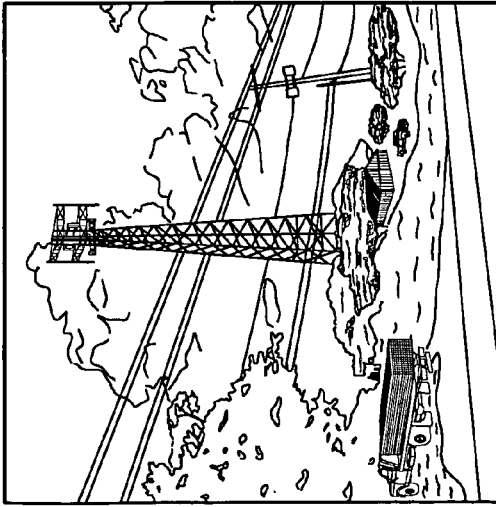
FIG. 8 is a pictorial representation of a selected communication site, displayed utilizing the method and system of the present invention.

Referring now to FIG. 8 there is depicted a pictorial representation of a selected communication site from the map of FIG. 7 which has been selected and displayed utilizing the method and system of the present invention. As illustrated, display 110 includes a photographic depiction 112 of the communication site in question. Additionally, at dialog box 114, there are multiple links to various levels of data and physical parameters associated with this particular communication site which can be selected and displayed in a manner, which will be illustrated in greater detail herein. Additionally, data concerning this particular location is depicted within dialog box 116, such as the address, county, area, nearest airport and distance to that airport.

Dialog box 118 depicts the latitude and longitude for this particular communication site; however, those having ordinary skill in the art will appreciate that other means for specifying the location of this communication site may also be utilized.

Figure 9:
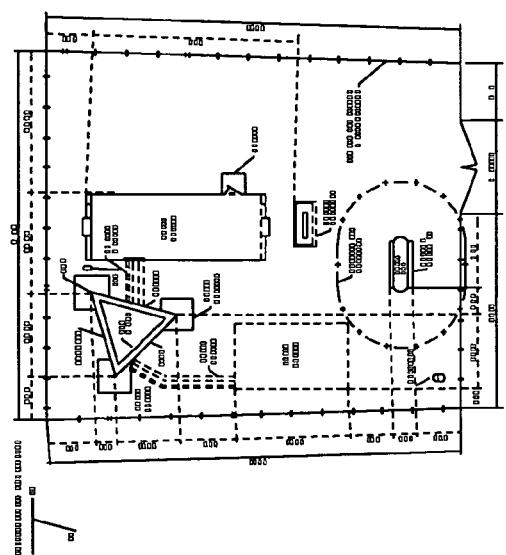
FIG. 9 is a pictorial representation of the site plan of the selected communication site of FIG. 8, displayed utilizing the method and system of the present invention.

Referring now to FIG. 9, there is depicted a pictorial representation of a site plan for the selected communication site of FIG. 8 which has been displayed utilizing the method and system of the present invention. As noted above, dialog 114 includes multiple links, including a link labeled "Site Plan" which, when selected, results in the display depicted within display 118. Thus, a plan view of the site where the selected communications site is located can be examined, greatly enhancing the ability of a user to efficiently manage communication sites across a wide geographic area by permitting that user to determine whether or not sufficient physical space exists within the site for additional communications equipment.

Figure 10:
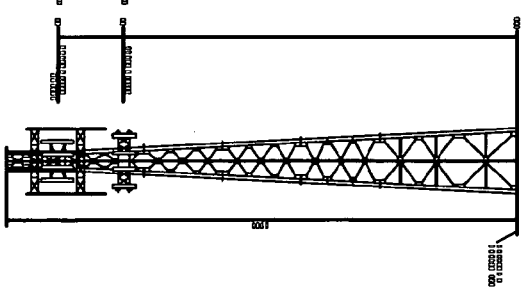
FIG. 10 is a pictorial representation of the structure of the selected communication site of FIG. 8, displayed utilizing the method and system of the present invention.

Referring now to FIG. 10, there is depicted a pictorial representation of the structure of the selected communication site of FIG. 8 which is displayed utilizing the method and system of the present invention. As above, dialog 114 includes a link labeled "Structure A" which, when selected, results in the display depicted at reference numeral 120. In a preferred embodiment of the present invention, this selection results in a depiction of actual engineering drawings of the particular communication site, where appropriate, so that decisions can be efficiently undertaken regarding the ability of a particular communication site to sustain and support additional communications equipment.

Next, with reference to FIG. 11, there is depicted a tabular illustration of measured communication signal strength for various transmitting entities in the vicinity of a selected communication site, which are displayed in accordance with the method and system of the present invention. As noted, this tabular representation includes a specification of the frequency band 132 and the carrier name 136. As each entity authorized to transmit in the radio frequency spectrum within the United States requires a license from the Federal Communications Commission, the identity of each entity broadcasting at a particular frequency may be simply and expediently determined utilizing government records. Thereafter, radio frequency communication equipment may be placed in vans, trucks or other vehicles and driven in the vicinity of a communication site to measure the strength of signals received from each licensed transmitter of radio frequency communication at that location. This technique then results in a classification of the signal strength for each authorized transmitting entity and, as depicted at blocks 138 and 140, the actual signal strengths and perceived need for additional signal strength for each identified entity may be tabulated and listed within the database utilized with the method and system of the present invention.

As also illustrated within FIG. 11, the particular communication protocol may be listed, as depicted at reference number 144. Similarly, the observed average signal strength is listed at reference numeral 142 and the failed call ratio is depicted at reference numeral 146. The number of data points utilized to create the received signal strength listing is set forth within column 148 and a confidence value is depicted at reference numeral 150. Further, for administrative purposes, the identification of the team or entity performing these measurements may be listed as well as the date upon which the measurement was taken, as depicted at reference numerals 152 and 154.

Thus, by obtaining data concerning each authorized transmitter of radio frequency data within a particular geographic area and tabulating that information as set forth within table 130, for each identified communication site, it will be possible, in the manner described above, for the user of the present system to rapidly and efficiently identify those authorized transmitters within a particular geographic area for whom additional radio frequency signal strength should be beneficial.

Referring now to FIG. 12, there is depicted a pictorial representation of the selection of all communication sites within a specified radius of a designated point in accordance with another embodiment of the present invention. As depicted in FIG. 12, a selected point 162 has been designated along with a specified radius. Thus, as illustrated within display 160, a circle 164 about point 162 having the specified radius has been depicted, graphically indicating those communication sites which are within the specified radius of that point for consideration in management of radio frequency coverage throughout the geographic area thus depicted. The location of center point 162 is also depicted, as indicated at reference numeral 166, in latitude and longitude; however, as noted above, those skilled in the art will appreciate that proprietary map coordinates or other identifying indicia may also be utilized.

Figure 13:
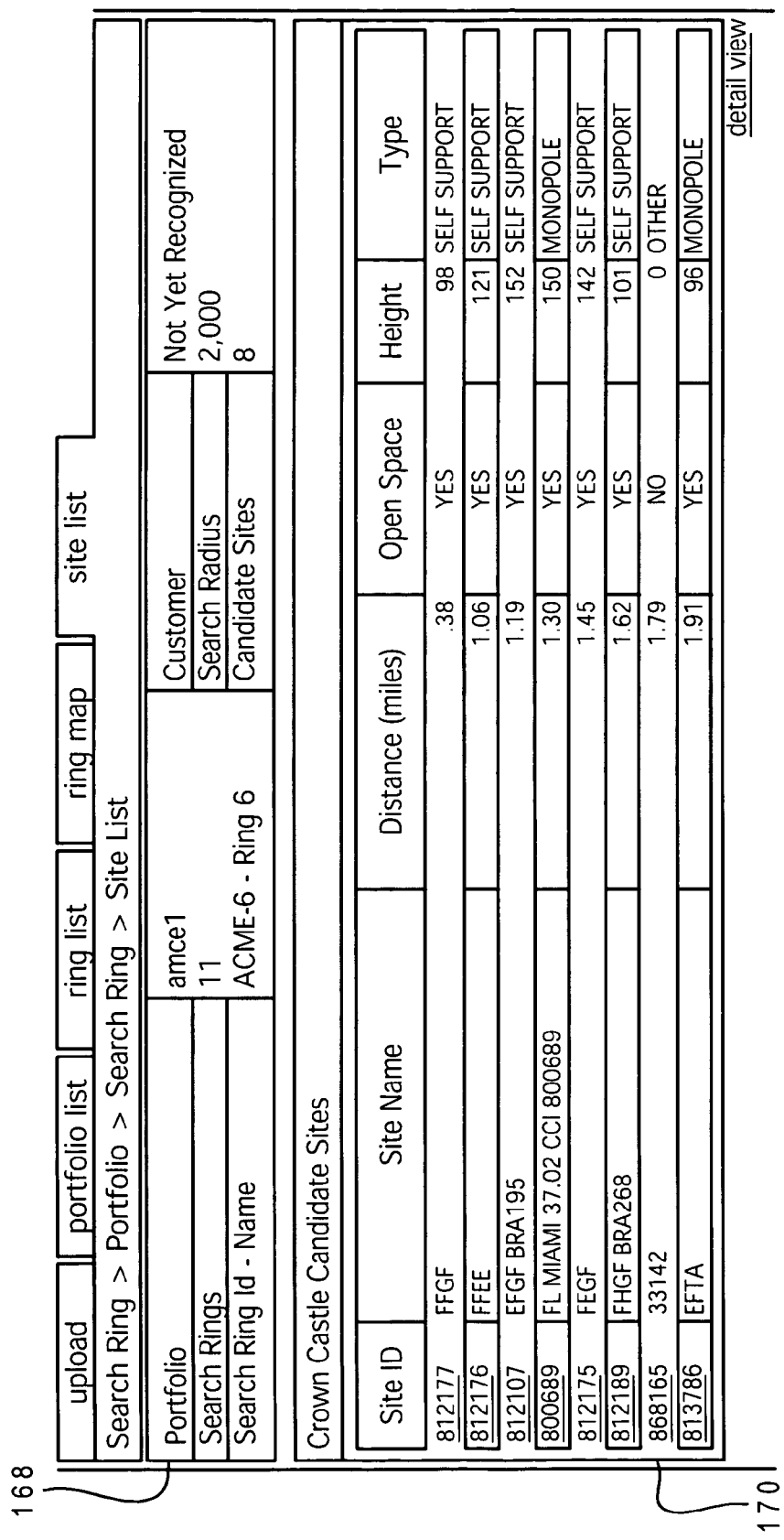
FIG. 13 is a tabular listing of all communication sites within a specified radius of the designated point of FIG. 12, in accordance with the method and system of the present invention.

With reference now to FIG. 13, there is depicted a tabular listing of all communication sites within the specified radius of the designated point of FIG. 12, depicted in accordance with method and system of the present invention. As illustrated at block 168, a particular center point and radius, commonly referred to as a "search ring", is specified. Thereafter, as depicted at block 170, a listing of each communication site which falls within the selected radius of the specified point is depicted. The site identifications, names and distance in miles from the center point are listed as well as, in the depicted embodiment of the present invention, the height of the communication site and the particular type of structure utilized for each communication site.

Referring now to FIG. 14, there is depicted a pictorial representation of general site information including multiple physical parameters associated with a particular site which may be selected and displayed in accordance with a method and system of the present invention. As noted above, dialog window 114 includes multiple links which may be selected to view the physical parameters associated with a particular communication site. As illustrated in this display at reference numeral 174, general site information including latitude, longitude and various characterizations of the particular structure which forms the communication site may be depicted. Dialog box 176 may be utilized to indicate a relative score for this particular communication site which can be calculated utilizing numerous techniques, including the parameters which are described herein. Finally, dialog box 178 depicts an efficient technique for determining the readiness of a particular communication site for utilization by a client or customer including structural, compound, utilities, land use, ground lease and readiness. Each of these parameters will be described in greater detail below.

Referring now to FIG. 15, there is depicted a tabular representation 178 of the "At-a-Glance" readiness section of the general site information depicted within FIG. 14. As noted, readiness of a particular communication site may be subdivided into multiple categories including structural readiness 180, compound readiness 182, utilities readiness 183, land use readiness 184, ground lease readiness 185 and regulatory readiness 186. Selectable numerical grades may be assigned to each of these readiness factors and an overall readiness score may be combined with an estimated time frame for completed installation, as depicted at block 188.

Referring now to FIG. 16, there is depicted a tabular representation 190 of the structural readiness component of a particular communication site in accordance with the method and system of the present invention. As illustrated, a tabular presentation is depicted which includes all information pertaining to the structural aspects of a particular communication site, including the availability of open levels on a tower, the available ports, the height of the structure and various additional information such as the presence or absence of a manufacturer drawing, foundation drawing or the like. In this manner all pertinent information pertaining to the structural readiness of a particular communication site may be rapidly and efficiently accessed.

Next, with reference to FIG. 17, there is depicted a tabular representation 192 of the compound readiness aspects of the selected communication site. Thus, the number of standard shelter spaces available for additional equipment and the number of other useable spaces within the compound can be identified. The availability of a building or other structure within the compound and the size of the compound in square feet and the size of the leased space for the compound may also be specified.

Referring now to FIG. 18, there is depicted a tabular representation 194 of the utility information readiness aspects of the selected communication site. As illustrated, tabular representation 194 includes an indication of whether or not sufficient electrical power is available at the site, whether or not a meter space is available and whether or not a generator is present or whether the generator has sufficient capacity. Thus, referring to tabular representation 194, a proposed user may determine rapidly and efficiently whether or not sufficient utility support at a particular communication site is present to permit additional communications from that site.

With reference now to FIG. 19, there is depicted a tabular representation 196 of the land use information aspects of the readiness of a particular communications site. As illustrated, this portion of the database specifies whether or not a land use permit is required for antenna installation and whether or not the landlord's signature is required on that application. Further, this portion of the database may be utilized to specify the estimated time believed to be necessary to obtain a land use approval from the time the application is submitted.

Referring now to FIG. 20, there is depicted a tabular representation 198 which specifies that ground lease information aspects of readiness for a particular communication site in accordance with the method and system of the present invention. As illustrated, this portion of the database specifies the expiration dates for any lease involved in this communication site as well as revenue sharing and landlord consent information necessary to make decisions with respect to the utilization of this communication site for radio frequency coverage within a wide geographic area.

Finally, with reference to FIG. 21, there is depicted a tabular representation 200 of the regulatory information aspects of the readiness of a particular communication site in accordance with the method and system of the present invention. As illustrated, this tabular representation specifies, within the database of the present invention, a determination of whether or not an FCC ASR number is applicable and if so, the number of that FCC ASR. Additionally, approved frequency bands, the location of directional AM stations and non-AM stations in proximity to the communications site may be specified within tabular representation 200 of the database of the present invention.

Upon reference of the foregoing, those skilled in the art will appreciate that the Applicants have created a method and system whereby radio frequency communication coverage over a wide geographic area may be rapidly and efficiently managed by creating a database specifying each of a plurality of communication sites and various physical parameters associated with those sites. By determining the signal strength transmitted by approved entities within the vicinity of each communication site a particular communication site may be rapidly and efficiently selected by specifying the selection of communication sites where signal strength from particular licensed transmitters falls below a specified signal level or by displaying those communication sites which fall within a specified radius of a particular geographic location. Thereafter, after selecting a particular communications site, all aspects of that site may be determined and the readiness of a particular site for utilization can be readily ascertained. In this manner, management of radio frequency coverage over wide geographic areas can be readily accomplished in a manner far more complete and accurate than previously available.

While the invention has been particularly shown and described with reference to a preferred embodiment, it will be understood by those skilled in the art that various changes in form and detail may be made therein without departing from the spirit and scope of the invention.

What is claimed is:

1. A computer implemented method for management of radio frequency communication coverage over a wide geographic area, said method comprising the computer implemented steps of:

creating a database specifying a geographic location for each of a plurality of existing communication locations within a wide geographic area and a listing of physical parameters associated with each communication location, including space availability for additional communications equipment;

periodically verifying said plurality of physical parameters for selected ones of said plurality of existing communication locations and thereafter validating said plurality of physical parameters within said database;

storing measured signal strength at each specified communication frequency in a predetermined radius around each existing communication location within said database;

selecting an entity authorized to transmit by government authorities within said wide geographic area utilizing a specified communication frequency; and thereafter, selectively accessing said database and listing each existing communication location within said database in a geographic location having a signal strength below a specified level for said selected entity authorized to transmit by government authorities within said wide geographic area by displaying a list of all existing communication locations within said database in a geographic location having a signal strength below a specified level and a listing of physical parameters associated wit each communication location, including space availability for additional communications equipment.

2. The computer implemented method for management of radio frequency communication coverage in accordance with claim 1 further including the step of permitting access to said database across a wide area network.

3. The computer implemented method for management of radio frequency communication coverage in accordance with claim 2 further including the step of requiring a user to enter a selected password prior to permitting access to said database across said wide area network.

4. The computer implemented method for management of radio frequency communication coverage in accordance with claim 1 wherein said step of creating a database specifying a geographic location for each of a plurality of existing communication locations within a wide geographic area comprises the step of creating a database specifying a longitude and latitude for each of a plurality of existing communication locations within a wide geographic area.

5. The computer implemented method for management of radio frequency communication coverage in accordance with claim 1 wherein said step of creating a database specifying a geographic location for each of a plurality of existing communication locations within a wide geographic area comprises the step of creating a database specifying a geographical location and a plurality of physical parameters for each of said plurality of existing communication locations within a wide geographic area.

6. A computer implemented system for management of radio frequency communication coverage over a wide geographic area, said system comprising:
   a computer;
   a database within said computer specifying a geographic location for each of a plurality of existing communication, locations within a wide geographic area and a listing of physical parameters associated with each communication location, including space availability for additional communications equipment;
   a listing within said database showing a periodic verification of said plurality of physical parameters for selected ones of said plurality of existing communication locations;
   a listing within said database of each entity authorized to transmit by government authorities within said wide geographic area utilizing a specified communication frequency; a listing of measured signal strength at each specified communication frequency in a predetermined radius around each existing communication location within said database; and means for selectively accessing said database and listing each existing communication location within said database in a geographic location having a signal strength below a specified level for a specific entity authorized to transmit by government authorities within said wide geographic area by displaying a list of all existing communication locations within said database in a geographic location having a signal strength below a specified level and a listing of physical parameters associated with each communication location, including space availability for additional communications equipment.

7. The computer implemented system for management of radio frequency communication coverage according to claim 6 further including means for permitting access to said database across a wide area network.

8. The computer implemented system for management of radio frequency communication coverage according to claim 7 further including means for requiring a user to enter a selected password prior to permitting access to said database across said wide area network.

9. The computer implemented system for management of radio frequency communication coverage according to claim 6 wherein said database specifying a geographic location for each of a plurality of existing communication locations within a wide geographic area comprises a database specifying a longitude and latitude for each of a plurality of existing communication locations within a wide geographic area.

\* \* \* \* \*

UNITED STATES PATENT AND TRADEMARK OFFICE
CERTIFICATE OF CORRECTION

PATENT NO. : 7,116,980 B2 Page 1 of 1
APPLICATION NO. : 10/739516
DATED : October 3, 2006
INVENTOR(S) : Bigler et al.

It is certified that error appears in the above-identified patent and that said Letters Patent is hereby corrected as shown below:

In Claim 1, at column 10, line 60, delete "wit" and insert --with--.

Signed and Sealed this

Twenty-sixth Day of December, 2006

JON W. DUDAS
*Director of the United States Patent and Trademark Office*